United States Patent [19]

Reid

[11] Patent Number: 4,666,033
[45] Date of Patent: May 19, 1987

[54] AUGER APPARATUS

[76] Inventor: Rod B. Reid, 3625 Grant Creek Rd., Missoula, Mont. 59802

[21] Appl. No.: 839,962

[22] Filed: Mar. 17, 1986

Related U.S. Application Data

[63] Continuation-in-part of Ser. No. 590,154, Mar. 16, 1984, abandoned.

[51] Int. Cl.$^4$ .............................................. B65G 33/30
[52] U.S. Cl. .......................... 198/664; 29/157.3 AH; 29/156.8 R; 29/456; 193/12; 198/677; 241/260.1
[58] Field of Search ........ 29/456, 156.8 R, 157.3 AH; 272/56.5 R; 198/657, 664, 666, 677, 662; 193/12; 241/260.1; 414/311, 310; 209/117

[56] References Cited

U.S. PATENT DOCUMENTS

| | | | |
|---|---|---|---|
| 234,868 | 11/1880 | Hawkins | 198/664 |
| 295,731 | 3/1884 | Caldwell | 198/677 X |
| 901,819 | 10/1908 | Neitzel | 198/677 X |
| 915,702 | 3/1909 | Schroer | 198/666 X |
| 2,443,288 | 6/1948 | Anderson | 198/666 |
| 3,360,108 | 12/1967 | Voss | 198/659 |
| 3,485,116 | 12/1969 | Fender | 29/456 UX |
| 3,659,700 | 5/1972 | Tunderman | 198/677 X |
| 3,705,644 | 12/1972 | Kawchitch | 198/664 |
| 3,762,537 | 10/1973 | Lutz | 198/664 |
| 3,967,722 | 7/1976 | Dietert | 198/659 |

FOREIGN PATENT DOCUMENTS 2924047  1/1981  Fed. Rep. of Germany ...... 198/677
1165336  9/1969  United Kingdom ................ 198/666

Primary Examiner—Charlie T. Moon
Attorney, Agent, or Firm—Arthur L. Urban

[57] ABSTRACT

Auger apparatus includes a drive portion, a connector portion and a flight portion. The drive portion includes an elongated rigid shaft member including a longitudinal axis disposed along the path of material being advanced by the auger apparatus. The connector portion includes a continuous stub section affixed to and extending outwardly from the periphery of the shaft member, the stub section being spirally disposed around the shaft member along the length thereof. The stub section includes a surface extending outwardly from the shaft member and substantially perpendicular thereto. The flight portion includes a plurality of radially cut elongated disc members, each of the disc members having an internal opening substantially equal in diameter to the outside diameter of the shaft member. An internal section of each disc member surrounding the internal opening thereof is in full contact with and affixed to the perpendicular surface of the stub section. The disc members are arranged sequentially in contact with the perpendicular surface of the continuous stub section along substantially the entire length thereof with radially cut edges of adjacent disc members butting against each other along planes oriented diagonally to a major surface of the disc members. The disc members are disposed on the side of the stub section adjacent the material being advanced by the auger apparatus.

19 Claims, 9 Drawing Figures

U.S. Patent   May 19, 1987   4,666,033
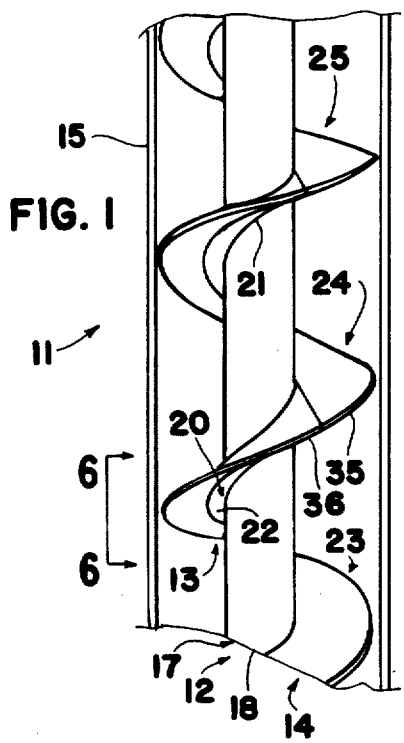
FIG. 1
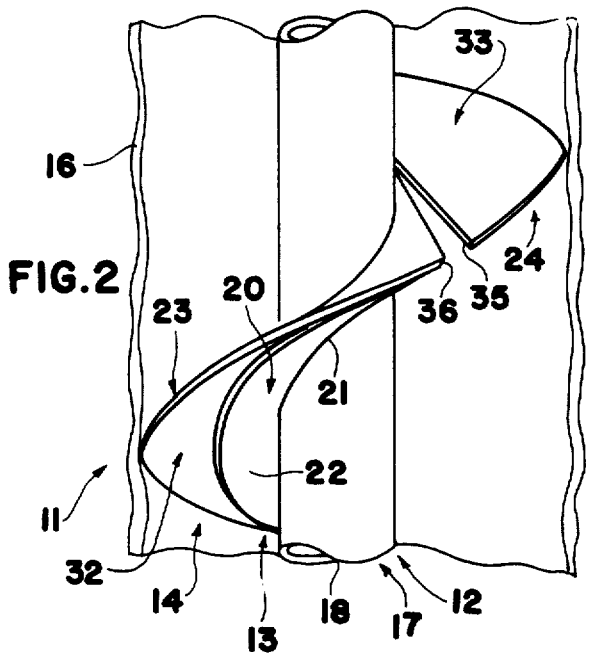
FIG. 2
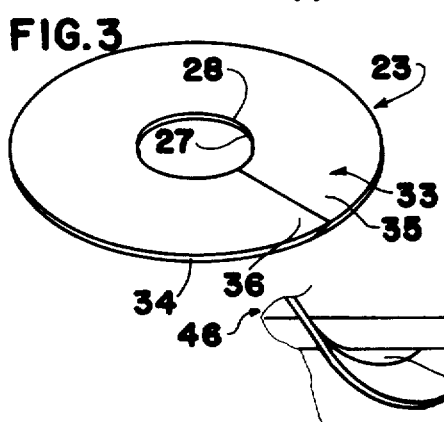
FIG. 3
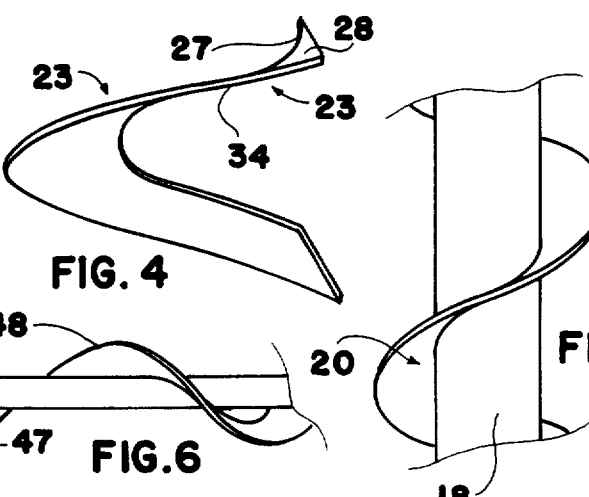
FIG. 4
FIG. 5
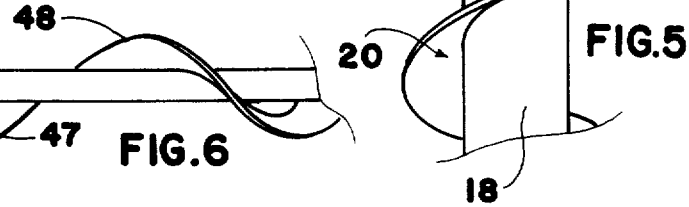
FIG. 6
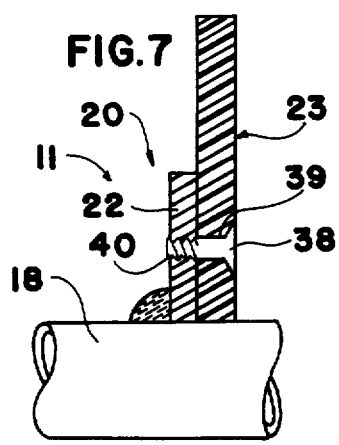
FIG. 7
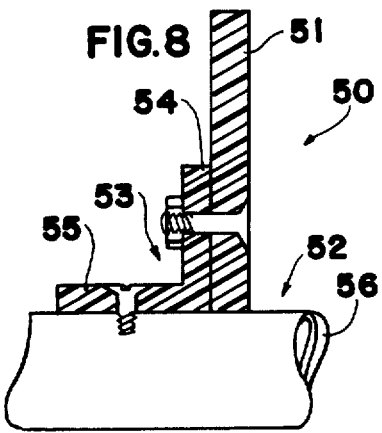
FIG. 8
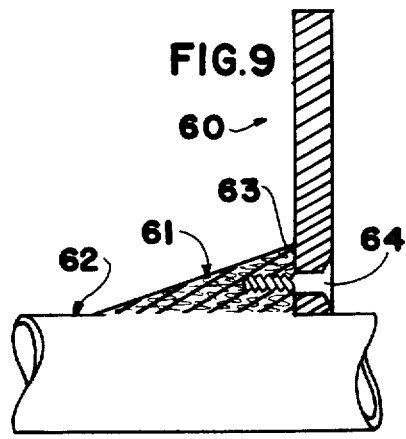
FIG. 9

AUGER APPARATUS

This application is a continuation-in-part of pending application Ser. No. 590,154, filed Mar. 16, 1984, now abandoned.

This invention relates to a novel auger apparatus and more particularly relates to a new and improved auger apparatus.

The movement of materials from one location to another has been a common necessity throughout history. A wide variety of different expedients have been utilized to accomplish this objective. Boxes, bottles, jars and similar containers have been and still are employed for such purposes depending upon the form of the materials and the quantities to be moved.

Where large quantities of materials are to be moved, it is desirable to transfer the materials on a continuous basis. Conveyors such as endless belts, augers and the like are employed under these conditions.

Augers frequently are utilized for the movement of particulate materials. Augers generally include a driven screw-like member disposed in a length of tubing or a trough. Quantities of particulate material are carried by the spiral of the auger along the tubing or tough from one end to the other. Augers commonly are fabricated by welding a spiral of metal stripping to a drive shaft to form the screw-like member. The auger may be driven by an electric motor either directly or through a belt and pulley arrangement.

Although augers are widely used to move materials such as grain, coal, gravel and similar materials, they are most effective with relatively soft inert materials. If the materials being transferred are corrosive and/or highly abrasive, conventional steel augers will have a relatively short useful life.

The corrosion or abrasion of the auger may cause the auger surfaces to become severely damaged so that portions thereof may be worn away and break off requiring shutdown of the operation and repair or replacement of the auger. If this shutdown occurs too frequently, the operation can become economically impractical and even occasional shutdowns can seriously reduce efficiency.

In an attempt to overcome the problems with steel augers, it has been proposed to use corrosion or abrasion resistant materials such as stainless or other special steels. However, such steels are very expensive and thus add greatly to the cost of the auger. It also has been proposed to coat auger surfaces with a corrosion or abrasion resistant material. While various plastic materials are resistant to corrosion, the coating of the steel surfaces has been unsuccessful because of the poor adhesion to the steel. Plastic materials with even fair adhesive properties are difficult to find and very expensive. Thus, the plastic coating of steel augers has not provided a feasible solution.

Replacement of conventional auger flights is a formidable task that requires special tools and skills. Proper positioning of relatively rigid stripping of considerable width can be difficult and time-consuming. Ordinarily, an auger is returned to the manufacturer or to a service facility, both of which probably are located at considerable distances from the job site. Alternatively, a skilled workman must be imported to do the repairs. These complications greatly increase downtime and expense as well as result in a significant loss of productivity.

From the above discussion, it is clear that presently available augers do not provide a practical expedient for moving many particulate materials. Thus, there is a need for a new auger apparatus that overcomes the shortcomings and deficiencies of previous augers.

The present invention provides a novel auger apparatus with features and advantages not found in previous augers. The auger apparatus of the invention has a high degree of corrosion resistance to most corrosive materials. Also, the auger apparatus has a high degree of abrasion resistance, in fact greater than stainless steel. Furthermore, the auger apparatus of the invention has a very low coefficient of friction so power requirements are significantly reduced as compared with steel augers.

The auger apparatus of the present invention is simple in design and can be produced more easily and at a cost significantly lower than steel augers. The auger apparatus can be fabricated from commercially available material and components. Augers with variable pitch and/or variable diameter can be produced if desired.

The auger apparatus of the invention permits damaged flights to be replaced in the field by operating personnel. Damaged flights can be replaced quickly and conveniently at the job site without special tools or skills. Thus, downtime can be reduced to a minimum and production and use resumed in a short period of time. Further, replacement components and elements can be manipulated to conform with existing structure easily and frequently by hand.

The auger apparatus of the invention is light in weight which allows it to be moved easily and conveniently. Also, the light weight reduces the mass of the supporting structure which decreases the cost of the apparatus. The auger apparatus is durable in construction and has a long useful life.

The auger apparatus is versatile and can be employed for the transfer of a wide variety of different particulate materials. The auger apparatus of the invention can be employed by workmen as conventional augers without special procedures or techniques.

These and other benefits and advantages of the novel auger apparatus of the present invention will be apparent from the following description and the accompanying drawings in which:

FIG. 1 is a side view of one form of the auger apparatus of the invention;

FIG. 2 is an enlarged fragmentary side view of the auger apparatus shown in FIG. 1;

FIG. 3 is a view in perspective of a disc member for the auger apparatus shown in FIG. 1;

FIG. 4 is a side view of the disc member shown in FIG. 3 in a deformed condition;

FIG. 5 is a fragmentary side view of the auger apparatus shown in FIG. 1 with a stub section affixed to a shaft member;

FIG. 6 is a side view of another form of the auger apparatus of the invention;

FIG. 7 is an enlarged sectional view taken along line 6—6 of FIG. 1;

FIG. 8 is a sectional view of another form of the auger apparatus of the invention; and FIG. 9 is a sectional view of a further form of the auger apparatus of the invention.

As shown in the drawings, one form of novel auger apparatus 11 of the present invention includes a drive portion 12, a connector portion 13 and a flight portion 14. The auger apparatus 11 may be partly or completely enclosed with a shroud such as a trough 15 or tubing 16.

The drive portion 12 of the auger apparatus 11 of the invention includes an elongated rigid shaft member 17. The shaft member includes a longitudinal axis disposed along the path of material (not shown) being advanced upwardly in FIG. 1. The shaft member 17 advantageously may be a metal rod or tubing such as a steel shaft 18 with or without an outer plastic sleeve or coating.

The connector portion 13 of the auger apparatus 11 includes a continuous stub section 20. The stub section 20 is affixed to and extends outwardly from the periphery of the shaft member 17. The stub section 20 is spirally disposed around the shaft member along the length thereof. The stub section includes a surface 22 extending outwardly from the shaft member 17 and substantially perpendicularly thereto. The stub section 20 advantageously includes one or more narrow steel strips or bands positioned end to end which have one edge 21 affixed to the shaft member, preferably by welding.

The flight portion 14 of the auger apparatus 11 of the invention includes a plurality of radially cut elongated disc members. The number of elongated disc members shown as discs 23, 24 and 25 will depend upon the overall length of the auger apparatus and the pitch of the flight portion.

Each disc member has an internal opening 27 that is substantially equal in diameter to the outside diameter of the shaft member 17. An internal section 28 of each disc member surrounding the internal opening 27 thereof is in full contact with and affixed to the perpendicular surface 22 of the stub section 20.

Advantageously, the radial width of the disc member between the internal opening and the outer periphery thereof is between about one and one-half and four or five or more times the radial width of the stub section. Conversely, the stub section preferably has a radial width between about one-third and two-thirds the radial width of the disc member.

The disc members 23–25 are spirally deformed and arranged sequentially in contact with the perpendicular surface 22 of the stub section 20 along substantially the entire length thereof. The radially cut edges 35 and 36 of adjacent disc members abut against each other along planes oriented diagonally to a major surface 32 of the disc members as shown in FIGS. 1 and 2 of the drawings.

The disc members are disposed on the side of the stub section so the material moving along the auger apparatus will be in contact with the disc member rather than the stub section. Thus, as shown in FIG. 1, particulate material (not shown) would be moving upwardly along the auger apparatus from the lower end thereof to the upper end and the material would be in contact with the exposed upwardly facing surface 33 of each disc member. In this construction, the underside of internal section 28 of each disc member would be in full contact with the stub section surface 22 on which it rests.

The auger apparatus 11 of the present invention is formed by first selecting a length of steel tubing 18 of the appropriate length and diameter. Then, the stub section 20 is affixed to the shaft by spiraling a narrow steel strip about the shaft with one edge 21 of the strip in contact therewith. The strip edge next is welded to the shaft to produce a structure as shown in FIG. 5.

Thereafter, a plurality of disc members 23–25 are formed with each having an internal opening 27 that is substantially equal in diameter to the outside diameter of the shaft 18. Advantageously, the plastic disc members are formed of a heat softenable plastic such as a polyolefin plastic and preferably an ultrahigh molecular weight polyolefin such as a polyethylene having a molecular weight of at least about 3,500,000.

Each disc member next is cut radially from the periphery 34 thereof to the enlarged center opening 27. The cut is at an angle to a main section or surface 32. The cut advantageously is at an angle of about 45° to the main section. The cut is at the same angle for all of the disc members. The cutting may be accomplished with a suitable cutting machine such as a band saw or the like, preferably with the disc positioned in a jig (not shown).

The cut edges 35 and 36 thereafter are drawn or pulled away from each other in a direction substantially parallel to the axis of the disc member, that is, substantially perpendicular to the main section 32. The drawing or stretching of the cut edges of the disc advantageously may be accomplished by hand with or without heating.

Thereafter, the deformed disc members 23, 24 and 25 are spiraled into the stub section 20 on the shaft 18. As pointed out above, the disc members are positioned on the side of the stub section so the particulate material moving along the auger apparatus is in contact with the disc members rather than the stub section.

The stretched disc members 23–25 are oriented with one another so the cut edges 35 and 36 of adjoining disc members abut one another. The abutting of the cut edges is such that the cut edge 35 of succeeding disc member 24 is behind the adjoining cut edge 36 of the preceding disc member 23 in the direction of material flow along the length of the auger apparatus 11. In this way, the cut edge 35 provides support for the cut edge 36 of the preceding disc.

The internal sections 28 of the disc members are affixed to the adjacent stub section with suitable fastening means. For example, bolts 38 extend through openings 39 in the disc member and into threaded openings 40 in the stub section 20 as shown in FIG. 7.

The resulting assembly then is mounted in a suitable tube or trough and a power source (not shown) such as a drive belt may be attached thereto. The auger apparatus 11 now is ready for use in the same way as conventional augers.

Since the flight portion 14 is formed of an ultra-high molecular weight polyethylene, corrosive and/or abrasive materials can be advanced by the auger apparatus for long periods of time with minimum wear on the flight portion. However, after extended service or an accident, one or more of the disc members of the flight portion may need to be replaced.

With the auger apparatus 11 open for servicing, bolts 38 securing the disc members 23, 24 and 25 to the stub section 20 are removed to free the damaged disc member. The disc member is removed and a new disc member substituted and secured to the shaft 18 using the same bolts by threading the bolts through openings 39 of the disc and into openings 40 in the stub section. Replacement can be performed quickly by the operating workmen without special skills or tools. Expense and downtime are reduced to a minimum so that productive efficiency is maintained at a high level.

FIG. 6 illustrates another form of auger apparatus 46 of the invention having a variable pitch/variable diameter configuration. The use of this auger apparatus can be employed to simplify the conveying of materials that have a tendency to pack or compress between adjacent flights.

Variable pitch auger apparatus of the invention can be fabricated easily by adjusting the pitch of the steel band utilized for the stub section 47 prior to welding it to the shaft 18. The disc members similar to those employed for auger apparatus 11 can be used to complete the variable pitch auger apparatus. Variable diameter auger apparatus can be constructed by using disc members 48 of slightly smaller diameters or disc members in which the central opening is offset from the center.

FIG. 8 shows a further form of auger apparatus 50 of the present invention in which disc members 51 are affixed to a shaft 52 through a right angle strip 53 that includes one section 54 that is in contact with the disc members and the other section 55 is in contact with the shaft 52 that includes an outer plastic sleeve 56. This construction is particularly useful with plastic stub sections that can be bolted both to the plastic covered shaft and to the plastic disc members.

FIG. 9 illustrates an additional form of auger apparatus 60 of the invention in which a stub section 61 is formed integrally with a shaft 62. This construction is suitable with fiberglass/resin molded shafts wherein a tapered stub section with a generally triangular cross section can be molded onto the shaft. The stub section has a surface 63 perpendicular to the shaft against which the disc member bears and is affixed through fastening means such as bolts 64.

The above description and the accompanying drawings show that the present invention provides a novel auger apparatus with features and advantages not found in previous augers. The auger apparatus of the invention can be utilized successfully for the handling of corrosive and/or abrasive materials. In addition, the low coefficient of friction of the auger apparatus significantly reduces the power required to drive the auger.

The auger apparatus of the invention can be moved easily because of its light weight. The apparatus can be employed for the transfer of a wide variety of different particulate materials.

The auger apparatus can be fabricated from commercially available materials and components at a cost significantly less than that of conventional augers and more simply and conveniently. The auger apparatus is durable in construction and has a long useful life.

Damaged flights can be replaced when necessary in the field by operating personnel without special training or tools. The replacement can be accomplished easily and quickly so downtime and interruption of production is minimized.

It will be apparent that various modifications can be made in the particular auger apparatus described in detail and shown in the drawings within the scope of the invention. The size, configuration and arrangement of components can be different to meet specific requirements. These and other changes can be made in the auger apparatus of the invention provided the functioning and operation thereof are not adversely affected. Therefore, the scope of the present invention is to be limited only by the following claims.

What is claimed is:

1. Auger apparatus including a drive portion, a connector portion and a flight portion; said drive portion including an elongated rigid shaft member, said shaft member including a longitudinal axis disposed along the path of material being advanced by said auger apparatus; said connector portion including a continuous spiral stub section affixed to and extending outwardly from the periphery of said shaft member, said stub section being spirally disposed around said shaft member along the length thereof, said stub section including a surface extending outwardly from said shaft member and substantially perpendicular thereto; said flight portion including a plurality of radially cut spirally elongated disc members, each of said disc members having an internal opening substantially equal in diameter to the outside diameter of said shaft member, an internal section of each disc member surrounding said internal opening thereof being in full contact with and affixed to said perpendicular surface of said stub section, said disc members being arranged sequentially in contact with said perpendicular surface of said continuous spiral stub section along substantially the entire length thereof with radially cut edges of adjacent disc members butting against each other along planes oriented diagonally to a major surface of said disc members, said disc members extending outwardly substantially beyond the periphery of said stub section and being disposed on the side of said stub section adjacent the material being advanced by said auger apparatus.

2. Auger apparatus according to claim 1 wherein said shaft member includes a length of metal tubing.

3. Auger apparatus according to claim 2 wherein said metal tubing is a steel tube.

4. Auger apparatus according to claim 1 wherein said shaft member includes a plastic section.

5. Auger apparatus according to claim 1 wherein said stub section is a steel strip.

6. Auger apparatus according to claim 5 wherein said strip is welded to said shaft member.

7. Auger apparatus according to claim 1 wherein said stub section is bolted to said shaft member.

8. Auger apparatus according to claim 1 wherein said stub section is integrally formed with said shaft member.

9. Auger apparatus according to claim 8 wherein said shaft member and said stub section are integrally molded.

10. Auger apparatus according to claim 1 wherein said stub section has a right angle cross section.

11. Auger apparatus according to claim 1 wherein said stub section has a triangular cross section.

12. Auger apparatus according to claim 1 wherein said disc members are formed of a polyolefin.

13. Auger apparatus according to claim 12 wherein said polyolefin is an ultrahigh molecular weight polyolefin with a molecular weight of at least 3,500,000.

14. Auger apparatus according to claim 12 wherein said polyolefin is a polyethylene.

15. Auger apparatus according to claim 1 wherein said disc members are cut radially at an angle of about 45° to a major surface thereof.

16. Auger apparatus according to claim 1 wherein said stub section has a radial width between about one-fifth and two-thirds the radial width of said disc members.

17. Auger apparatus according to claim 1 wherein said stub section has a radial width between about one-third and two-thirds the radial width of said disc members.

18. Auger apparatus according to claim 1 wherein said disc members are elongated to different lengths providing a variable pitch along said auger apparatus.

19. Auger apparatus according to claim 1 wherein said disc members have different diameters along the length of said apparatus.

* * * * *